United States Patent
Yoo

(10) Patent No.: US 11,887,524 B2
(45) Date of Patent: Jan. 30, 2024

(54) DISPLAY DEVICE AND DRIVING METHOD THEREOF

(71) Applicant: SAMSUNG DISPLAY CO., LTD., Yongin-si (KR)

(72) Inventor: Gi Na Yoo, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/833,080

(22) Filed: Jun. 6, 2022

(65) Prior Publication Data

US 2023/0105229 A1 Apr. 6, 2023

(30) Foreign Application Priority Data

Oct. 1, 2021 (KR) .......................... 10-2021-0131184

(51) Int. Cl.
*G09G 3/20* (2006.01)
*G06F 3/01* (2006.01)

(52) U.S. Cl.
CPC ........... *G09G 3/2007* (2013.01); *G06F 3/013* (2013.01); *G09G 2320/0242* (2013.01); *G09G 2320/043* (2013.01); *G09G 2354/00* (2013.01)

(58) Field of Classification Search
CPC ......... G09G 3/2007; G09G 2320/0242; G09G 2320/043; G09G 2354/00; G06F 3/013
See application file for complete search history.

(56) References Cited

U.S. PATENT DOCUMENTS

| | | | | |
|---|---|---|---|---|
| 7,708,407 | B2 * | 5/2010 | Yang | ........................ G06T 5/50 |
| | | | | 345/581 |
| 8,054,258 | B2 | 11/2011 | Choi et al. | |
| 9,837,011 | B2 * | 12/2017 | Kim | ...................... G09G 3/2003 |
| 10,424,232 | B2 * | 9/2019 | Schubert | ................ G02B 26/06 |
| 10,502,963 | B1 * | 12/2019 | Noble | ................ B29D 11/0073 |
| 10,534,185 | B1 * | 1/2020 | Lee | .......................... G06F 3/013 |
| 11,011,095 | B2 * | 5/2021 | Zhao | ..................... G09G 3/3637 |
| 2007/0291227 | A1 * | 12/2007 | Yang | ..................... G09G 3/3611 |
| | | | | 351/210 |
| 2016/0321976 | A1 | 11/2016 | Kim et al. | |
| 2017/0337898 | A1 * | 11/2017 | Liao | ......................... G09G 5/10 |
| 2019/0197928 | A1 * | 6/2019 | Schubert | .............. H04N 13/376 |
| 2020/0074909 | A1 * | 3/2020 | Zhao | ...................... H04N 5/202 |
| 2022/0375428 | A1 * | 11/2022 | He | .......................... G06F 3/013 |
| 2023/0105229 | A1 * | 4/2023 | Yoo | ...................... G09G 3/2007 |
| | | | | 345/690 |

FOREIGN PATENT DOCUMENTS

KR 101350973 B1 1/2014

* cited by examiner

*Primary Examiner* — Michael J Jansen, II
(74) *Attorney, Agent, or Firm* — CANTOR COLBURN LLP

(57) ABSTRACT

A driving method of a display device includes receiving a deterioration amount for a target pixel, calculating a first compensation amount for the target pixel based on the deterioration amount for the target pixel, receiving a gaze angle of a user with respect to the target pixel, selecting one of the first compensation amount and a second compensation amount based on the gaze angle, and calculating an output grayscale for the target pixel by applying the one of the first compensation amount and the second compensation amount to an input grayscale of the target pixel, where the second compensation amount is calculated based on the gaze angle, and the first compensation amount is calculated regardless of the gaze angle.

20 Claims, 13 Drawing Sheets

DISPLAY DEVICE AND DRIVING METHOD THEREOF

This application claims priority to Korean Patent Application No. 10-2021-0131184, filed on Oct. 1, 2021, and all the benefits accruing therefrom under 35 U.S.C. § 119, the content of which in its entirety is herein incorporated by reference.

BACKGROUND

1. Field

Embodiments of the invention relate to a display device and a driving method thereof.

2. Description of the Related Art

As an information technology is developed, an importance of a display device, which is a connection medium between users and information, is being highlighted. Therefore, a display device such as a liquid crystal display device, an organic light-emitting diode display device, or the like is being increasingly used.

As a number of pixels used increases, a deterioration amount increases, and as the deterioration amount increases, the pixels emit light with a lower luminance for the same input grayscale. Therefore, it is desired to properly compensate the input grayscale and calculate an output grayscale.

SUMMARY

Even when the same pixel emits light for the same output grayscale, differences in luminance and color perceived by a user may occur according to user's gaze angle.

A feature of the invention is to provide a display device capable of changing a degree of deterioration compensation for an input grayscale according to a gaze angle of a user, and a driving method thereof.

A driving method of a display device in an embodiment of the invention includes receiving a deterioration amount for a target pixel, calculating a first compensation amount for the target pixel based on the deterioration amount for the target pixel, receiving a gaze angle of a user with respect to the target pixel, selecting one of the first compensation amount and a second compensation amount based on the gaze angle, and calculating an output gray scale for the target pixel by applying the one of the first compensation amount and the second compensation amount to the input grayscale of the target pixel, where the second compensation amount is calculated based on the gaze angle, and the first compensation amount is calculated regardless of the gaze angle.

In an embodiment, in the selecting, when the gaze angle is out of a first reference range, the first compensation amount is selected, the gaze angle is an angle between a display surface of the target pixel and a gaze of the user, and a case when the gaze angle is out of the first reference range may include a case when the gaze angle is about 90 degrees.

In an embodiment, in the selecting, when the gaze angle is within the first reference range, the second compensation amount may be selected.

In an embodiment, in the selecting, when a distance between first color coordinates to which the first compensation amount is applied and second color coordinates to which the second compensation amount is applied is out of a second reference range, the second compensation amount may be recalculated.

In an embodiment, in the selecting, a distance between the first color coordinates and recalculated second color coordinates to which a recalculated second compensation amount is applied may be smaller than the distance between first color coordinates to which the first compensation amount is applied and the second color coordinates to which the second compensation amount is applied.

In an embodiment, in the selecting, when the distance between the first color coordinates and the recalculated second color coordinates is within the second reference range, the second compensation amount finally calculated may be selected.

In an embodiment, in the selecting, the gaze angle is within the first reference range, and a distance between first color coordinates to which the first compensation amount is applied and reference color coordinates is smaller than a distance between color coordinates to which the first compensation amount is not applied and the reference color coordinates, the first compensation amount may be selected.

In an embodiment, in the selecting, when the gaze angle is within the first reference range and the distance between the first color coordinates and the reference color coordinates is greater than the distance between the color coordinates to which the first compensation amount is not applied and the reference color coordinates, the second compensation amount is selected.

In an embodiment, in the selecting, when a distance between the first color coordinates and second color coordinates to which the second compensation amount is applied is out of a second reference range, the second compensation amount may be recalculated.

In an embodiment, in the selecting, a distance between the first color coordinates and recalculated second color coordinates to which a recalculated second compensation amount is applied may be smaller than the distance between the first color coordinates and second color coordinates to which the second compensation amount is applied.

In an embodiment, in the selecting, when the distance between the first color coordinates and the recalculated second color coordinates is within the second reference range, the second compensation amount finally calculated may be selected.

A display device in an embodiment of the invention includes a plurality of pixels which display an image based on output grayscales, a gaze angle sensor which senses a gaze angle of a user with respect to a target pixel among the plurality of pixels, and a deterioration compensator which calculates a first compensation amount for the target pixel based on a deterioration amount for the target pixel, selects one of the first compensation amount and the second compensation amount based on the gaze angle, and calculate an output grayscale for the target pixel by applying the one of the first compensation amount and the second compensation amount to an input grayscale of the target pixel, where the deterioration compensator calculates the second compensation amount based on the gaze angle and calculates the first compensation amount regardless of the gaze angle.

In an embodiment, the deterioration compensator may select the first compensation amount when the gaze angle is out of a first reference range, the gaze angle may be an angle between a display surface of the target pixel and a gaze of the user, and a case when the gaze angle is out of the first reference range may include a case when the gaze angle is about 90 degrees.

In an embodiment, the deterioration compensator may select the second compensation amount when the gaze angle is within the first reference range.

In an embodiment, the deterioration compensator may recalculate the second compensation amount when a distance between first color coordinates to which the first compensation amount is applied and second color coordinates to which the second compensation amount is applied is out of a second reference range.

In an embodiment, a distance between the first color coordinates and recalculated second color coordinates to which a recalculated second compensation amount is applied may be smaller than the distance between first color coordinates to which the first compensation amount is applied and the second color coordinates to which the second compensation amount is applied.

In an embodiment, the deterioration compensator may select the second compensation amount finally calculated when the distance between the first color coordinates and the second color coordinates is within the second reference range.

In an embodiment, the deterioration compensator may select the first compensation amount when the gaze angle is within the first reference range, and a distance between first color coordinates to which the first compensation amount is applied and reference color coordinates is smaller than a distance between color coordinates to which the first compensation amount is not applied and the reference color coordinates.

In an embodiment, the deterioration compensator may select the second compensation amount when the gaze angle is within the first reference range, and the distance between the first color coordinates and the reference color coordinates is greater than the distance between the color coordinates to which the first compensation amount is not applied and the reference color coordinates.

In an embodiment, the deterioration compensator may recalculate the second compensation amount when a distance between the first color coordinates and second color coordinates to which the second compensation amount is applied is out of a second reference range, and a distance between the first color coordinates and recalculated second color coordinates to which a recalculated second compensation amount is applied may be smaller than the distance between the first color coordinates and second color coordinates to which the second compensation amount is applied.

The display device and the driving method thereof in an embodiment of the invention may change the degree of the deterioration compensation for the input grayscale according to the user's gaze angle.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
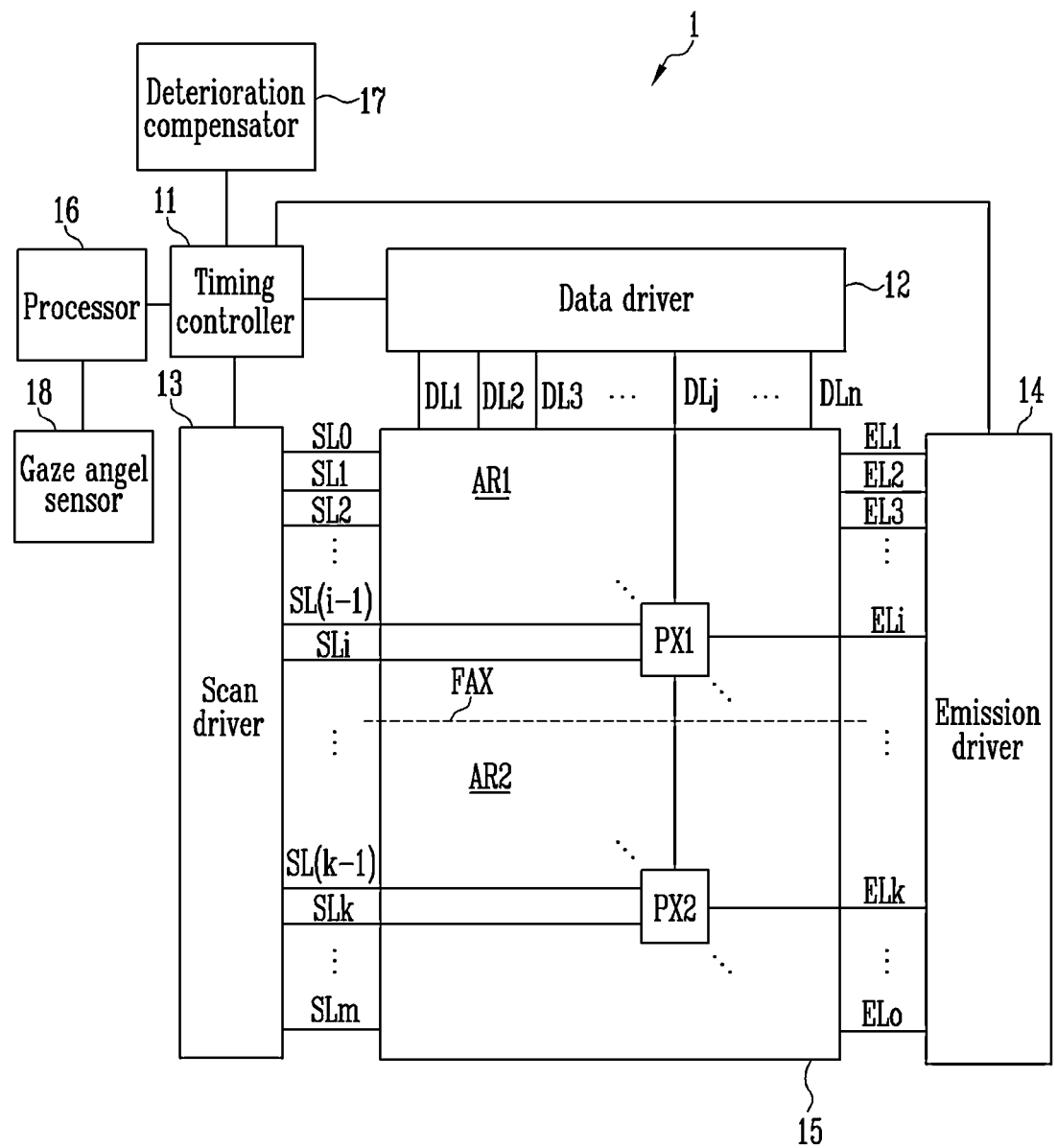
FIG. 1 is a drawing for illustrating an embodiment of a display device according to the invention.

Hereinafter, with reference to accompanying drawings, various embodiments of the invention will be described in detail so that those skilled in the art can easily carry out the invention. Embodiments of the invention may be embodied in many different forms and is not limited to the embodiments described herein.

In order to clearly illustrate the invention, parts that are not related to the description are omitted, and the same or similar constituent elements are given the same reference numerals throughout the specification. Therefore, the above-mentioned reference numerals can be used in other drawings.

In addition, since the size and thickness of each configuration shown in the drawing are arbitrarily shown for better understanding and ease of description, the invention is not necessarily limited to the illustrated one. In the drawings, the dimensions of layers and regions are exaggerated for clarity of illustration.

In addition, the expression "the same" in the description may mean "substantially the same". That is, it may be the same degree to which a person with ordinary knowledge can convince as the same. Other expressions may be expressions in which "substantially" is omitted.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. A term such as a compensator and a unit may mean a hardware component such as a circuitry, for example.

FIG. 1 is a drawing for illustrating an embodiment of a display device according to the invention.

Referring to FIG. 1, a display device 1 in an embodiment of the invention includes a timing controller 11, a data driver 12, a scan driver 13, a emission driver 14, a pixel unit 15, a processor 16, a deterioration compensator 17, and a gaze angle sensor 18.

The processor 16 may include at least one of a graphics processing unit ("GPU"), a central processing unit ("CPU"), an application processor ("AP"), or the like. The processor 16 may further include an additional circuit element for controlling the gaze angle sensor 18.

The gaze angle sensor 18 may sense a user's gaze angle for (with respect to) a target pixel among the plurality of pixels of the pixel unit 15. Hereinafter, for convenience of description, a driving method of the display device 1 for one target pixel will be described. However, embodiments of the invention may be repeatedly or collectively performed on a plurality of target pixels.

The gaze angle sensor 18 may be configured using known technology. In an embodiment, an inclination of the pixel unit 15 may be measured using a gyro sensor, a relative inclination of a first area AR1 and a second area AR2 may be measured using a folding angle sensor with respect to a folding axis FAX, or a position of the user's iris may be tracked using an iris recognition sensor, for example. In an embodiment, when the position of the user's iris and the inclination of the pixel unit 15 are measured with respect to the display device 1, the user's gaze angle for the target pixel may be determined, for example. The gaze angle sensor 18 may be configured as only one of these sensors, or may be configured as a set of a plurality of sensors.

The timing controller 11 may receive input grayscales and control signals for each image frame from the processor 16. Also, the timing controller 11 may receive a gaze angle for the target pixel from the processor 16. The timing controller 11 may provide the gaze angle and the input grayscale for the target pixel to the deterioration compensator 17. In an embodiment, the timing controller 11 may further provide additional data (e.g., temperature, current amount, etc.) necessary for generating a deterioration amount of the target pixel to the deterioration compensator 17.

The deterioration compensator 17 may calculate a first compensation amount for the target pixel based on the deterioration amount of the target pixel. Also, the deterioration compensator 17 may receive the user's gaze angle for the target pixel, and may select one of a first compensation amount and a second compensation amount based on the gaze angle. In this case, the second compensation amount may be calculated based on the gaze angle, and the first compensation amount may be calculated regardless of the gaze angle. The deterioration compensator 17 may calculate the output grayscale of the target pixel by applying the selected compensation amount to the input grayscale of the target pixel. In an embodiment, the deterioration compensator 17 may calculate the output grayscale of the target pixel by adding the selected compensation amount to the input grayscale of the target pixel, for example.

The timing controller 11 may receive the output grayscale of the target pixel from the deterioration compensator 17. The timing controller 11 may provide the output grayscale of the target pixel or the output grayscale of the target pixels to the data driver. In addition, the timing controller 11 may provide control signals suitable for each specification to the data driver 12, the scan driver 13, the emission driver 14, or the like to display an image corresponding to an image frame.

The data driver 12 may generate data voltages to be provided to the data lines DL1, DL2, DL3, . . . , DLj, . . . , and DLn by the output grayscales and the control signals. In an embodiment, the data driver 12 may sample the output grayscales using a clock signal, and may apply data voltages corresponding to the output grayscales to the data lines DL1 to DLn in units of pixel rows (e.g., pixels connected to the same scan line and emission line). j and n may be integers greater than zero, for example.

The scan driver 13 may receive a clock signal, a scan start signal, or the like from the timing controller 11 and may generate scan signals to be provided to the scan lines SL0, SL1, SL2, . . . , SL(i−1), SLi, . . . , SL(k−1), SLk, . . . , and SLm. Here, i, k, and m may be integers greater than 0. In addition, k may be an integer greater than i, and m may be an integer greater than k.

The scan driver 13 may sequentially supply scan signals having a turn-on level pulse to the scan lines SL0 to SLm. The scan driver 13 may include scan stages configured in a form of a shift register. The scan driver 13 may generate scan signals by sequentially transferring a scan start signal in the form of a turn-on level pulse to the next scan stage according to a control of the clock signal.

The emission driver 14 may receive a clock signal, an emission stop signal, or the like from the timing controller 11 and may generate emission signals to be provided to the emission lines EL1, EL2, EL3, . . . , ELi, . . . , ELk, . . . , and ELo. Here, o may be an integer greater than zero. In addition, o may be an integer greater than k. In an embodiment, the emission driver 14 may sequentially provide emission signals having a turn-off level pulse to the emission lines EL1 to ELo, for example. In an embodiment, each emission stage of the emission driver 14 may be configured in a form of a shift register, and may generate emission signals by sequentially transferring an emission stop signal in the form of a turn-off level pulse to the next emission stage according to a control of a clock signal, for example. In another embodiment, the emission driver 14 may be omitted according to the circuit configuration of the pixels PX1 and PX2.

The pixel unit 15 may include a first area AR1 and a second area AR2. The first area AR1 may include the first pixels PX1 connected to the data line DLj and the first scan lines SL0 to SLi. The second area AR2 may be in contact with the first area AR1 at the folding axis FAX, and may include the second pixels PX2 connected to the data line Dj and the second scan lines SL(k−1) and SLk. In FIG. 1, the folding axis FAX may be parallel to an extending direction of the scan lines SL0 to SLm, but in another embodiment, the folding axis FAX may be parallel to an extending direction of the data lines DL1 to DLn. In another embodiment, the folding axis FAX may not be parallel to all of the scan lines SL0 to SLm and the data lines DL1 to DLn (e.g., may extend in a diagonal direction).

Each of the pixels PX1 and PX2 may be connected to a corresponding data line, a scan line, and an emission line. In another embodiment, when the emission driver 14 is omitted, the pixels PX1 and PX2 may not be connected to the emission lines EL1 to ELo.

In an embodiment, the folding axis FAX may be physically defined. In an embodiment, the display device 1 may further include a mechanical configuration such as a hinge so that the display device 1 may be also configured to be folded or unfolded only with respect to the folding axis FAX, for example. In this configuration, the folding axis FAX may be fixed. In this case, the areas AR1 and AR2 may be fixed areas. In another embodiment, the display device 1 may also have a flexible mount that covers the display panel. In this case, the folding axis FAX may be variable. In this case, the areas AR1 and AR2 may be variable areas. In this case, the display device 1 may further include a pressure sensor, a bending sensor, a resistance sensor, or the like to detect the folding axis FAX.

In FIG. 1, for position comparison, the first pixel PX1 and the second pixel PX2 are illustrated as being connected to the same data line DLj. However, the first pixel PX1 and the second pixel PX2 may be connected to different data lines.

Figure 2:
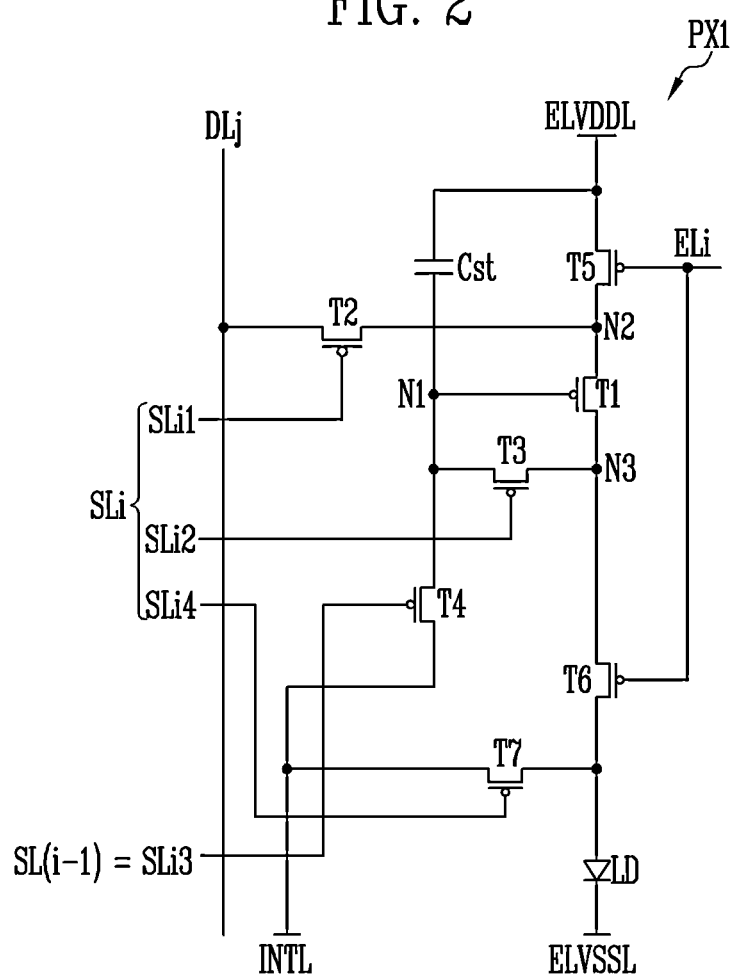
FIG. 2 is a drawing for illustrating an embodiment of a pixel according to the invention.

FIG. 2 is a drawing for illustrating an embodiment of a pixel according to the invention.

Referring to FIG. 2, the first pixel PX1 includes transistors T1, T2, T3, T4, T5, T6, and T7, a storage capacitor Cst, and a light-emitting element LD. Since the configuration of the second pixel PX2 is substantially the same as that of the first pixel PX1, a redundant description thereof will be omitted.

Hereinafter, a circuit consisting of a P-type transistor will be described as an example. However, those skilled in the art will be able to design a circuit consisting of an N-type transistor by changing a polarity of a voltage applied to a gate terminal. Similarly, those skilled in the art will be able to design a circuit consisting of a combination of a P-type transistor and an N-type transistor. The P-type transistor refers to a transistor in which current amount increases when a voltage difference between the gate electrode and the source electrode increases in a negative direction. The N-type transistor refers to a transistor in which current amount increases when a voltage difference between the gate electrode and the source electrode increases in a positive direction. The transistor may be configured in various forms, such as a thin film transistor ("TFT"), a field effect transistor ("FET"), a bipolar junction transistor ("BJT"), or the like.

The first transistor T1 may include a gate electrode connected to a first node N1, a first electrode connected to a second node N2, and a second electrode connected to a third node N3. The first transistor T1 may be also referred to as a driving transistor.

The second transistor T2 may include a gate electrode connected to the scan line SLi1, a first electrode connected to the data line DLj, and a second electrode connected to the second node N2. The second transistor T2 may be also referred to as a scan transistor.

The third transistor T3 may include a gate electrode connected to the scan line SLi2, a first electrode connected to the first node N1, and a second electrode connected to the third node N3. The third transistor T3 may be also referred to as a diode-connected transistor.

The fourth transistor T4 may include a gate electrode connected to the scan line SLi3, a first electrode connected to the first node N1, and a second electrode connected to the initialization line INTL. The fourth transistor T4 may be also referred to as a gate initialization transistor.

The fifth transistor T5 may include a gate electrode connected to the i-th emission line ELi, a first electrode connected to the first power line ELVDDL, and a second electrode connected to the second node N2. The fifth transistor T5 may be also referred to as a light-emitting transistor. In another embodiment, the gate electrode of the fifth transistor T5 may be connected to another emission line.

The sixth transistor T6 may include a gate electrode connected to the i-th emission line ELi, a first electrode connected to the third node N3, and a second electrode connected to the anode of the light-emitting element LD. The sixth transistor T6 may be also referred to as a light-emitting transistor. In another embodiment, the gate electrode of the sixth transistor T6 may be connected to a emission line different from the emission line connected to the gate electrode of the fifth transistor T5.

The seventh transistor T7 may include a gate electrode connected to the scan line SLi4, a first electrode connected to the initialization line INTL, and a second electrode connected to the anode of the light-emitting element LD. The seventh transistor T7 may be also referred to as a light-emitting element initialization transistor.

A first electrode of the storage capacitor Cst may be connected to the first power line ELVDDL, and a second electrode of the storage capacitor Cst may be connected to the first node N1.

The light-emitting element LD may have an anode connected to the second electrode of the sixth transistor T6 and a cathode connected to the second power line ELVSSL. The light-emitting element LD may be a light-emitting diode. The light-emitting element LD may include an organic light-emitting diode, an inorganic light-emitting diode, a quantum dot/well light-emitting diode, or the like. The light-emitting element LD may emit light in any one of a first color, a second color, and a third color. In addition, only one light-emitting element LD may be provided in each pixel in the illustrated embodiment, but a plurality of light-emitting elements may be provided in each pixel in another embodiment. In this case, the plurality of light-emitting elements may be connected in series, parallel, series-parallel, or the like.

A first power voltage may be applied to the first power line ELVDDL, a second power voltage may be applied to the second power line ELVSSL, and an initialization voltage may be applied to the initialization line INTL. In an embodiment, the first power voltage may be greater than the second power voltage, for example. In an embodiment, the initialization voltage may be equal to or greater than the second power voltage, for example. In an embodiment, the initialization voltage may correspond to a data voltage having the smallest magnitude among data voltages that may be provided, for example. In another embodiment, the magnitude of the initialization voltage may be smaller than magnitudes of data voltages that may be provided.

Figure 3:
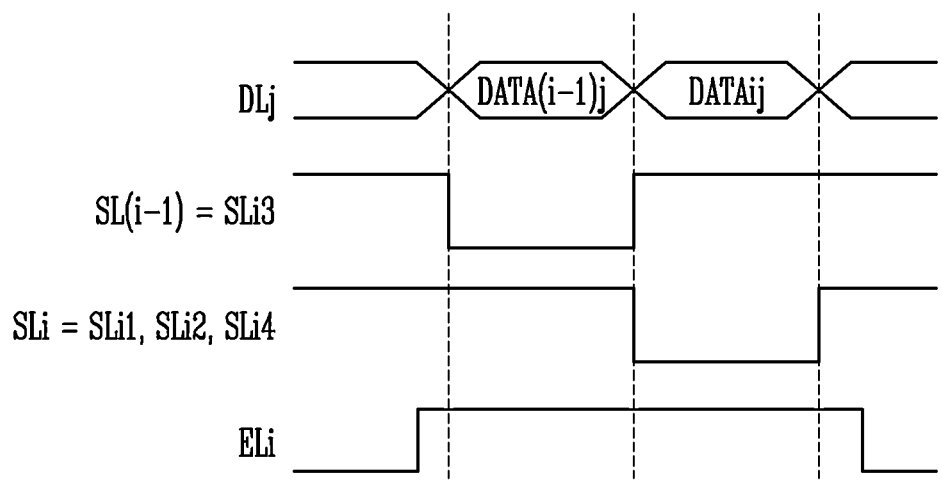
FIG. 3 is a drawing for illustrating an exemplary driving method of the pixel of FIG. 2.

FIG. 3 is a drawing for illustrating an exemplary driving method of the pixel of FIG. 2.

Hereinafter, for convenience of description, it is assumed that the scan lines SLi1, SLi2, and SLi4 are the i-th scan line SLi and the scan line SLi3 is the i–1-th scan line SL(i–1). However, a connection relationship of the scan lines SLi1, SLi2, SLi3, and SLi4 may change in other embodiments. In an embodiment, the scan line SLi4 may be an i–1-th scan line or an i+1-th scan line, for example.

First, a data voltage DATA(i–1)j for the i–1-th pixel is applied to the data line DLj, and a scan signal of a turn-on level (or a logic low level) is applied to the scan line SLi3.

At this time, since the scan signal of the turn-off level (of the logic high level) is applied to the scan lines SLi1 and SLi2, the second transistor T2 may be in a turn-off state so that the data voltage DATA(i–1)j for the i–1-th pixel may be prevented from being introduced into the pixel PXij.

At this time, since the fourth transistor T4 is in a turn-on state, the first node N1 may be connected to the initialization line INTL, and a voltage of the first node N1 may be initialized. Since an emission signal of the turn-off level is applied to the emission line ELi, the transistors T5 and T6 are in the turn-off state, and an unnecessary emission of the light-emitting element LD due to the application process of the initialization voltage may be prevented.

Next, a data voltage DATAij for the i-th pixel PXij may be applied to the data line DLj, and a scan signal of a turn-on level may be applied to the scan lines SLi1 and SLi2. Accordingly, the transistors T2, T1, and T3 may be in a conductive state, and the data line DLj and the first node N1 may be electrically connected. Accordingly, a compensation voltage obtained by subtracting the threshold voltage of the first transistor T1 from the data voltage DATAij may be applied to the second electrode (i.e., the first node N1) of the storage capacitor Cst, and the storage capacitor Cst may maintain a voltage corresponding to a difference between the first power voltage and the compensation voltage. This period may be also referred to as a threshold voltage compensation period.

Also, since the seventh transistor T7 is in a turn-on state when the scan line SLi4 is the i-th scan line, the anode of the light-emitting element LD and the initialization line INTL may be connected, and the light-emitting element LD may be initialized to an amount of charge corresponding to a voltage difference between the initialization voltage and the second power voltage.

Thereafter, as the emission signal of the turn-on level is applied to the emission line ELi, the transistors T5 and T6 may become conductive. Accordingly, a driving current may flow along a path generated through the first power line ELVDDL, the fifth transistor T5, the first transistor T1, the sixth transistor T6, the light-emitting element LD, and the second power line ELVSSL.

An amount of driving current flowing through the first electrode and the second electrode of the first transistor T1 may be adjusted depending on the voltage maintained in the storage capacitor Cst. The light-emitting element LD may emit light with a luminance corresponding to the amount of driving current. The light-emitting element LD may emit light until an emission signal of a turn-off level is applied to the emission line ELi.

Figure 4:
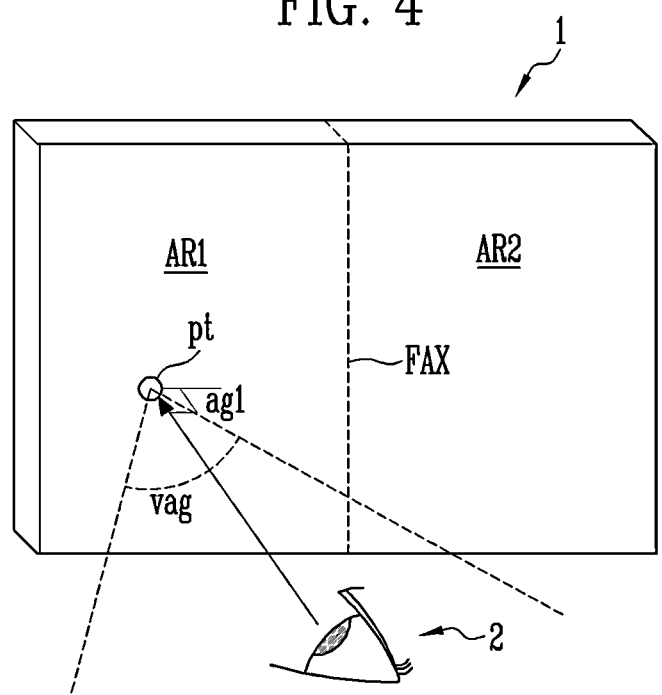
FIGS. 4 and 5 are drawings for illustrating a case where a user' gaze angle with respect to a target pixel is changed.
Figure 5:
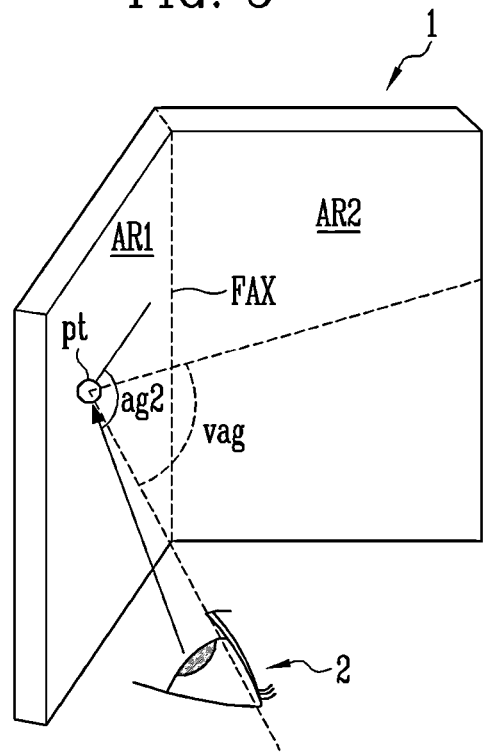

FIGS. 4 and 5 are drawings for illustrating a case where a user' gaze angle with respect to a target pixel is changed.

Referring to FIG. 4, the pixel unit 15 (refer to FIG. 1) of the display device 1 is not folded and is in a flat state. In this case, a gaze angle of the user 2 with respect to the target pixel pt may have a first angle ag1. The gaze angle may be an angle between a display surface of the target pixel pt and a gaze of the user 2. In an embodiment, the first angle ag1 may be an angle that satisfies a viewing angle vag of the display device 1, for example. In an embodiment, an imaginary line connecting a pupil of the user 2 and the target pixel pt may exist within a range of the viewing angle vag, for example. The viewing angle vag may refer to a maximum angle in a horizontal direction (or a vertical direction) at which luminance, chromaticity, gamma, etc., satisfy a predetermined criteria compared to optical characteristics in front of the screen. The viewing angle vag may change according to specifications of the display device 1. In an embodiment, the first angle ag1 may be about 90 degrees, for example. In this case, a gaze direction of the user 2 may be also referred to as a frontal direction.

Referring to FIG. 5, the pixel unit 15 of the display device 1 is in a state folded at a predetermined folding angle. In this case, a gaze angle of the user 2 with respect to the target pixel pt may have a second angle ag2. In an embodiment, the second angle ag2 may be an angle that does not satisfy a viewing angle vag of the display device 1, for example. In an embodiment, an imaginary line connecting a pupil of the user 2 and the target pixel pt may be out of a range of the viewing angle vag, for example. In an embodiment, the second angle ag2 may be greater than about 90 degrees, for example. In this case, a gaze direction of the user 2 may be also referred to as a lateral direction.

In the case of FIGS. 4 and 5, even when the target pixel pt emits light for the same output grayscale, the user 2 may perceive different luminance and color according to the gaze angle (i.e., the first angle ag1 or the second angle ag2). Therefore, appropriate compensation for a deterioration amount according to the gaze angle is desired.

Here, the gaze angle may be referred to indicate the larger of the angles between the display surface of the target pixel pt and the gaze of the user 2, but may be also referred to indicate the smaller of the angles between the display surface of the target pixel pt and the gaze of the user 2.

Here, the gaze angle may be illustrated with respect to a horizontal direction (e.g., a direction from the first area AR1 to the second area AR2). However, the same issue (i.e., perceiving different luminance and color) may occur even when the gaze angle may be illustrated with respect to the vertical direction (e.g., an extension direction of the folding axis FAX), and in order to solve this issue, embodiments of the invention may be applied.

Figure 6:
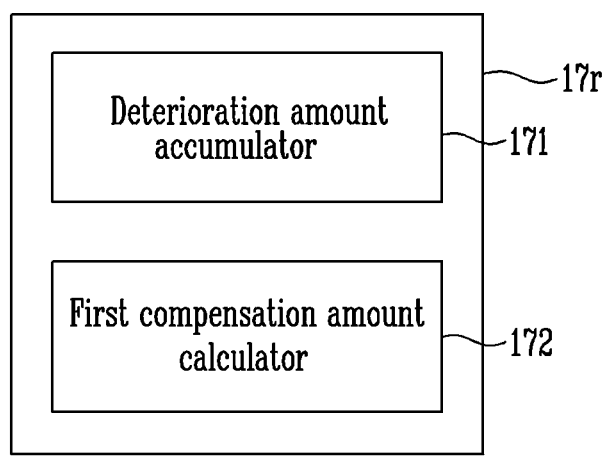
FIGS. 6 and 7 are drawings for illustrating a deterioration compensator.
Figure 7:
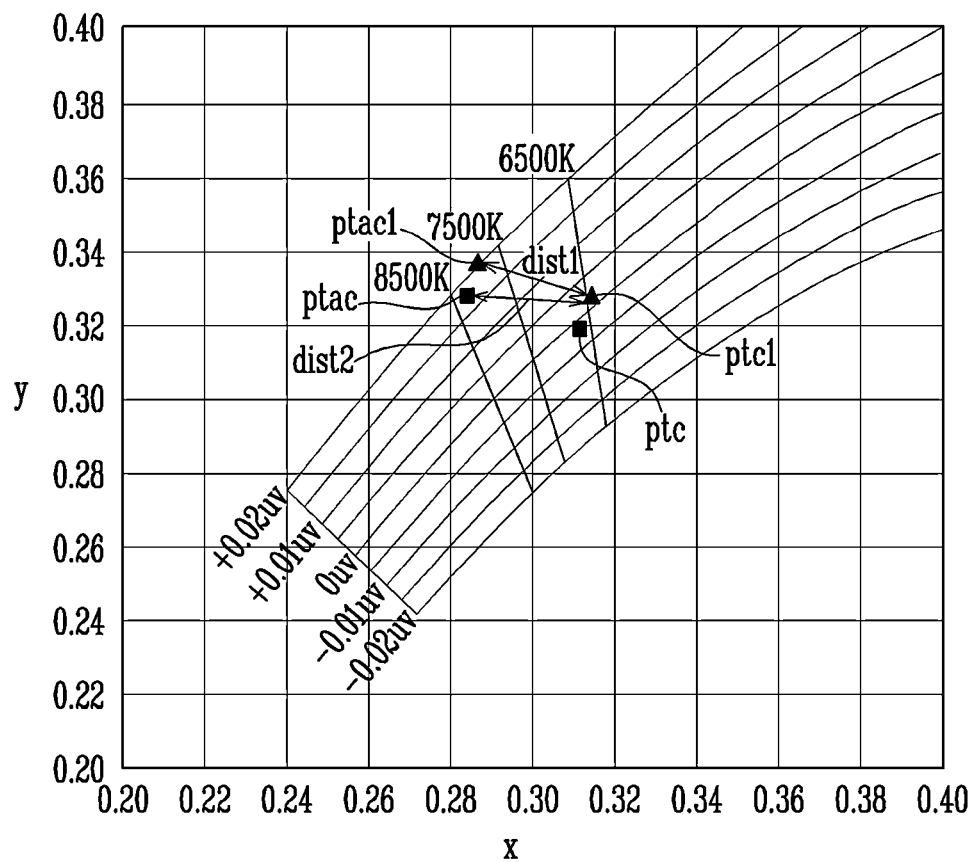

FIGS. 6 and 7 are drawings for illustrating a deterioration compensator.

Referring to FIG. 6, the deterioration compensator 17r may include a deterioration amount accumulator 171 and a first compensation amount calculator 172.

The deterioration amount accumulator 171 may store and update the deterioration amount of the pixels of the pixel unit 15. In an embodiment, the deterioration amount accumulator 171 may determine that the deterioration amount of the corresponding pixel increases as the grayscale level increases, the temperature increases, and the time duration of usage increases, for example.

The first compensation amount calculator 172 may receive the deterioration amount of the target pixel from the deterioration amount accumulator 171, and may calculate the first compensation amount corresponding to the deterioration amount. In an embodiment, the first compensation amount calculator 172 may greatly calculate the first compensation amount as the deterioration amount of the target pixel increases, for example. The first compensation amount to be calculated may be predetermined by an optical measuring apparatus before shipment of the display device 1 (refer to FIGS. 1, 4 and 5).

The first compensation amount may be a compensation amount on the premise that the gaze direction of the user 2 is a frontal direction (in the case of FIG. 4). The first compensation amount may be a compensation amount on the premise that the user 2 views an image within the viewing angle vag of the display device 1. In an embodiment, the first compensation amount may be a compensation amount on the premise that the gaze angle of the user 2 with respect to the target pixel pt is the first angle ag1, for example.

In an embodiment, the first compensation amount may be a positive number, for example. In an embodiment, when an input grayscale of a pixel having a relatively large deterioration amount is 100, an output grayscale may be 120 by adding the first compensation amount equal to 20, for example. When the input grayscale of a pixel having a relatively small deterioration amount is 100, the output grayscale may be 118 by adding the first compensation amount equal to 18. In another embodiment, the second compensation amount may be a negative number, for example. In an embodiment, when the input grayscale of a pixel having a relatively large deterioration amount is 100, the output grayscale may be 100 by adding the first compensation amount equal to 0, for example. When the input grayscale of a pixel having a relatively small deterioration amount is 100, the output grayscale may be 98 by adding the first compensation amount equal to −2.

Referring to FIG. 7, a part of the CIE 1931 chromaticity diagram may be illustrated based on the x and y coordinate system. For reference, a plurality of blackbody locus based on the delta uv value (−0.02, −0.01, 0, +0.01, and +0.02) and a color temperature (8500K, 7500K, and 6500K) across the plurality of blackbody locus (−0.02, −0.01, 0, +0.01, and +0.02) are illustrated. However, CIE 1931 may be an exemplary color space, and embodiments of the application may be also applied to other previously defined color spaces.

When the input grayscale of the target pixel pt is not compensated (i.e., the output grayscale and the input grayscale are the same) and the gaze direction of the user 2 is a frontal direction (in the case of FIG. 4), it is assumed that the user 2 perceives a color corresponding to color coordinates ptc from the target pixel pt. In addition, when the first compensation amount is applied to the input grayscale of the target pixel pt (i.e., the output grayscale is different from the input grayscale), and the gaze direction of the user 2 is the frontal direction (in the case of FIG. 4), it is assumed that the user 2 perceives a color corresponding to color coordinates ptc1 from the target pixel pt. In this case, the user may feel that the color coordinates ptc1, which is a color that is subjected to deterioration compensation, is more normal than the color coordinates ptc, which is a color that is not subjected to deterioration compensation.

When the input grayscale of the target pixel pt is not compensated (i.e., the output grayscale and the input grayscale are the same) and the gaze direction of the user 2 is the lateral direction (in the case of FIG. 5), it is assumed that the user 2 perceives a color corresponding to color coordinates ptac from the target pixel pt. In addition, when the first compensation amount is applied to the input grayscale of the target pixel pt (i.e., the output grayscale is different from the input grayscale) and the gaze direction of the user 2 is the lateral direction (in the case of FIG. 5), it is assumed that the user 2 perceives a color corresponding to the first color coordinates ptac1 from the target pixel pt. In this case, a distance dist1 between the first color coordinates ptac1 and the color coordinates ptc1 may be similar to a distance dist2 between the color coordinates ptac and the color coordinates ptc1. In this case, the user may feel that all the colors of the color coordinates ptac and the color coordinates ptac1 are abnormal, and the user may be difficult to distinguish between the colors of the color coordinates ptac and ptac1. That is, in the case of FIG. 5, simply applying the first compensation amount may not help improve image quality.

Figure 8:
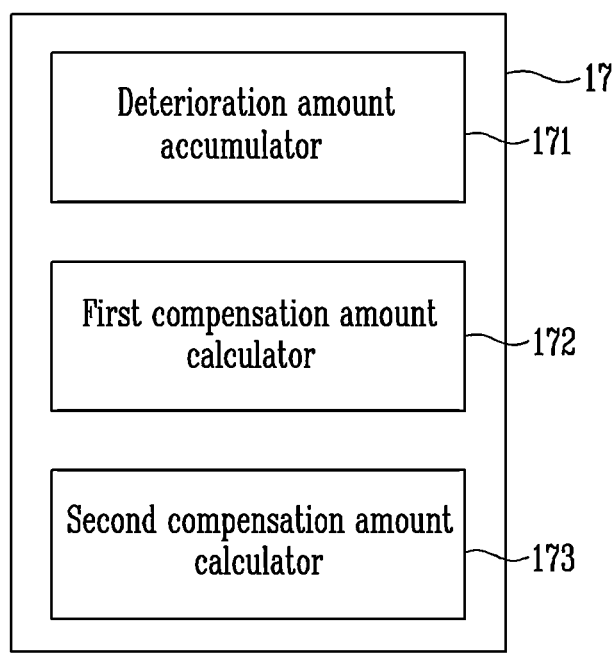
FIGS. 8 to 10 are drawings for illustrating an embodiment of a driving method of a deterioration compensator and a display device according to the invention.
Figure 9:
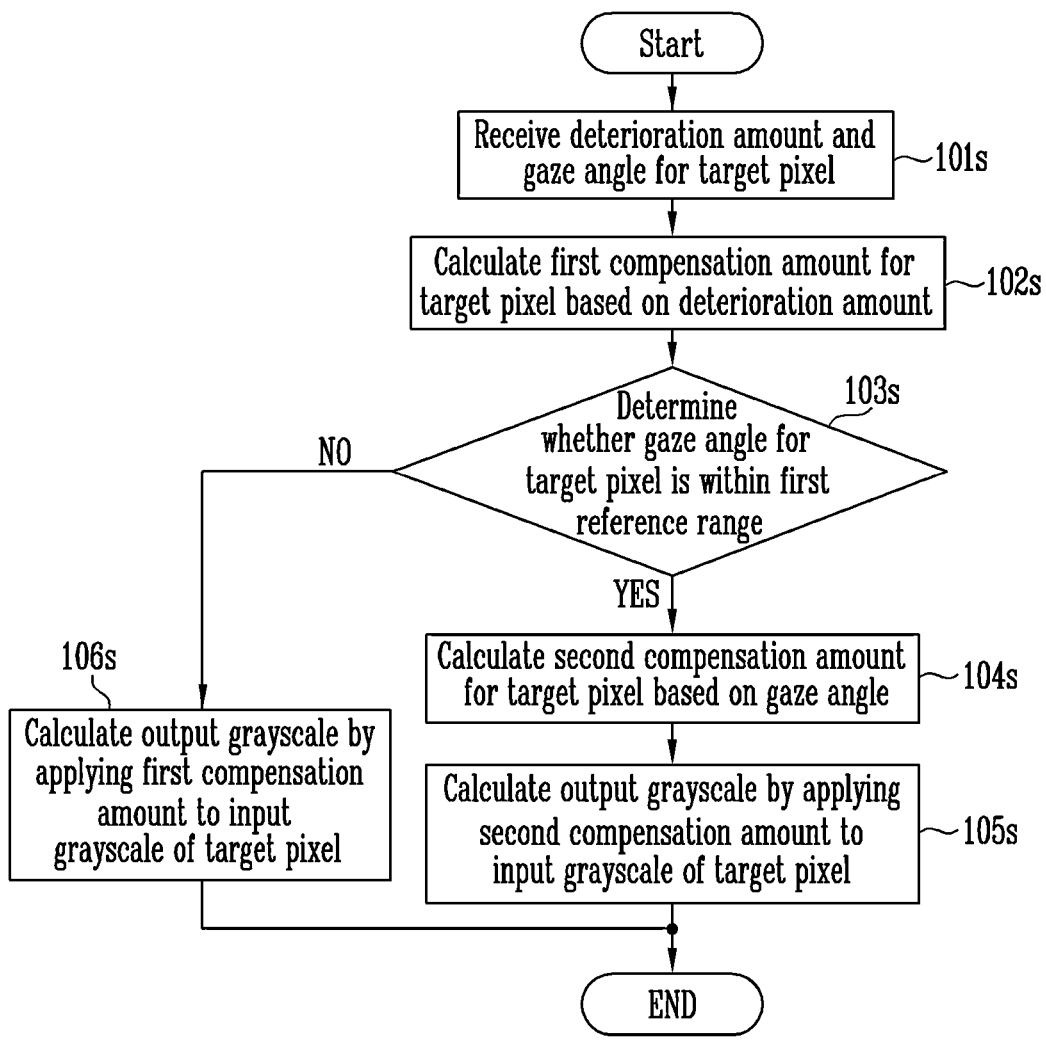
Figure 10:
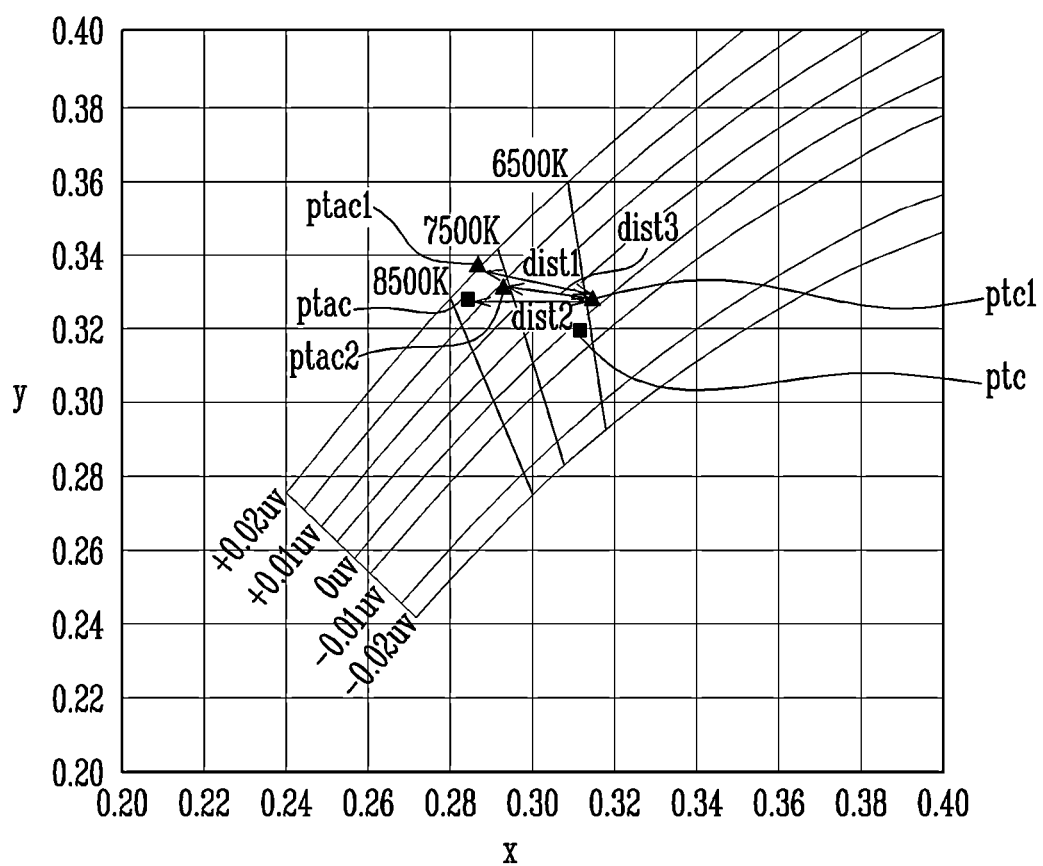

FIGS. 8 to 10 are drawings for illustrating an embodiment of a driving method of a deterioration compensator and a display device according to the invention.

Referring to FIG. 8, the deterioration compensator 17 in an embodiment of the invention may include a deterioration amount accumulator 171, a first compensation amount calculator 172, and a second compensation amount calculator 173. For the deterioration amount accumulator 171 and the first compensation amount calculator 172, a description of contents overlapping those of FIG. 6 will be omitted.

The deterioration amount accumulator 171, the first compensation amount calculator 172, and the second compensation amount calculator 173 may be integrally configured in hardware or software, or may be configured separately. A part or all of the deterioration compensator 17 may be configured integrally with the timing controller 11 (refer to FIG. 1) in hardware or software. The deterioration compensator 17 may be configured separately from the timing controller 11 in hardware or software.

The second compensation amount calculator 173 may calculate a second compensation amount for the target pixel pt based on the deterioration amount and the gaze angle of the target pixel pt. In an embodiment, the second compensation amount calculator 173 may receive the first compensation amount for the target pixel pt from the first compensation amount calculator 172, and may calculate the second compensation amount by correcting the first compensation amount according to the gaze angle, for example. In another embodiment, the second compensation amount calculator 173 may receive the deterioration amount of the target pixel pt from the deterioration amount accumulator 171, and may calculate the second compensation amount based on the deterioration amount and the gaze angle, for example. The second compensation amount to be calculated may be predetermined by an optical measuring apparatus before shipment of the display device 1 (refer to FIGS. 1, 4 and 5).

The second compensation amount may be a compensation amount on the premise that the gaze direction of the user 2 is a lateral direction (in the case of FIG. 5). The second compensation amount may be a compensation amount on the premise that the user 2 views the image out of the viewing angle vag of the display device 1. In an embodiment, the second compensation amount may be a compensation amount on the premise that the gaze angle of the user 2 with respect to the target pixel pt is the second angle ag2, for example.

The deterioration compensator 17 may select one of the first compensation amount and the second compensation amount based on the gaze angle. The deterioration compensator 17 may calculate the output grayscale of the target pixel pt by applying the selected compensation amount to the input grayscale of the target pixel pt. In an embodiment, the deterioration compensator 17 may calculate the output grayscale of the target pixel pt by adding the selected compensation amount to the input grayscale of the target pixel pt, for example.

A unit of the first compensation amount and the second compensation amount may be a gray scale. In an embodiment, the grayscale may be in a state (i.e., a state in which the luminance characteristic is reflected) in which a gamma value of the display device 1 is corrected or in a state (i.e., a state in which the luminance characteristic is not reflected) in which the gamma value of the display device 1 is not corrected.

Referring to FIG. 9, a driving method of the display device 1 (refer to FIGS. 1, 4 and 5) in an embodiment of the invention will be described.

The deterioration compensator 17 may receive the gaze angle for the target pixel pt from the timing controller 11 (or the gaze angle sensor 18). The first compensation amount calculator 172 may receive the deterioration amount of the target pixel pt from the deterioration amount accumulator 171 (operation 101s).

The first compensation amount calculator 172 may calculate the first compensation amount for the target pixel pt based on the deterioration amount of the target pixel pt (operation 102s).

The deterioration compensator 17 may select one of the first compensation amount and the second compensation amount based on the gaze angle. The deterioration compensator 17 may calculate the output grayscale of the target pixel pt by applying the selected compensation amount to the input grayscale of the target pixel pt. The second compensation amount may be calculated based on the gaze angle, and the first compensation amount may be calculated regardless of the gaze angle.

In an embodiment, the deterioration compensator 17 may determine whether the gaze angle for the target pixel pt is within a first reference range (operation 103s), for example. The first reference range may be a range of the gaze angle of the user 2 that does not satisfy the viewing angle vag of the display device 1. The first reference range may include a case in which the gaze angle is the second angle ag2 (refer to FIG. 5). Conversely, a range out of the first reference range may be a range of the gaze angle of the user 2 that satisfies the viewing angle vag of the display device 1, and may include a case in which the gaze angle is about 90 degrees. The range out of the first reference range may include a case in which the gaze angle is the first angle ag1 (refer to FIG. 4).

When the gaze angle for the target pixel pt is out of the first reference range, the deterioration compensator 17 may select the first compensation amount. The deterioration compensator 17 may calculate the output grayscale by applying (e.g., adding) the first compensation amount to the input grayscale of the target pixel pt (operation 106s). In this case, the second compensation amount calculator 173 does not need to calculate the second compensation amount.

When the gaze angle for the target pixel pt is within the first reference range, the deterioration compensator 17 may select the second compensation amount. In this case, the second compensation amount calculator 173 may calculate a second compensation amount for the target pixel pt based on the gaze angle (operation 104s). The deterioration compensator 17 may calculate the output grayscale by applying (e.g., adding) the second compensation amount to the input grayscale of the target pixel pt (operation 105s).

Referring to FIG. 10, compared with FIG. 7, second color coordinates ptac2 to which the second compensation amount is applied is further illustrated. When the second compensation amount is applied to the input grayscale of the target pixel pt (i.e., the output grayscale is different from the input grayscale) and the gaze direction of the user 2 is the lateral direction (in the case of FIG. 5), it is assumed that the user 2 perceives a color corresponding to the second color coordinates ptac2 from the target pixel pt.

In this case, a distance dist3 between the second color coordinates ptac2 and the color coordinates ptc1 may be smaller than the distances dist1 and dist2. Accordingly, since the user 2 perceives a more normal color, applying the second compensation amount in the case of FIG. 5 helps improve image quality.

Figure 11:
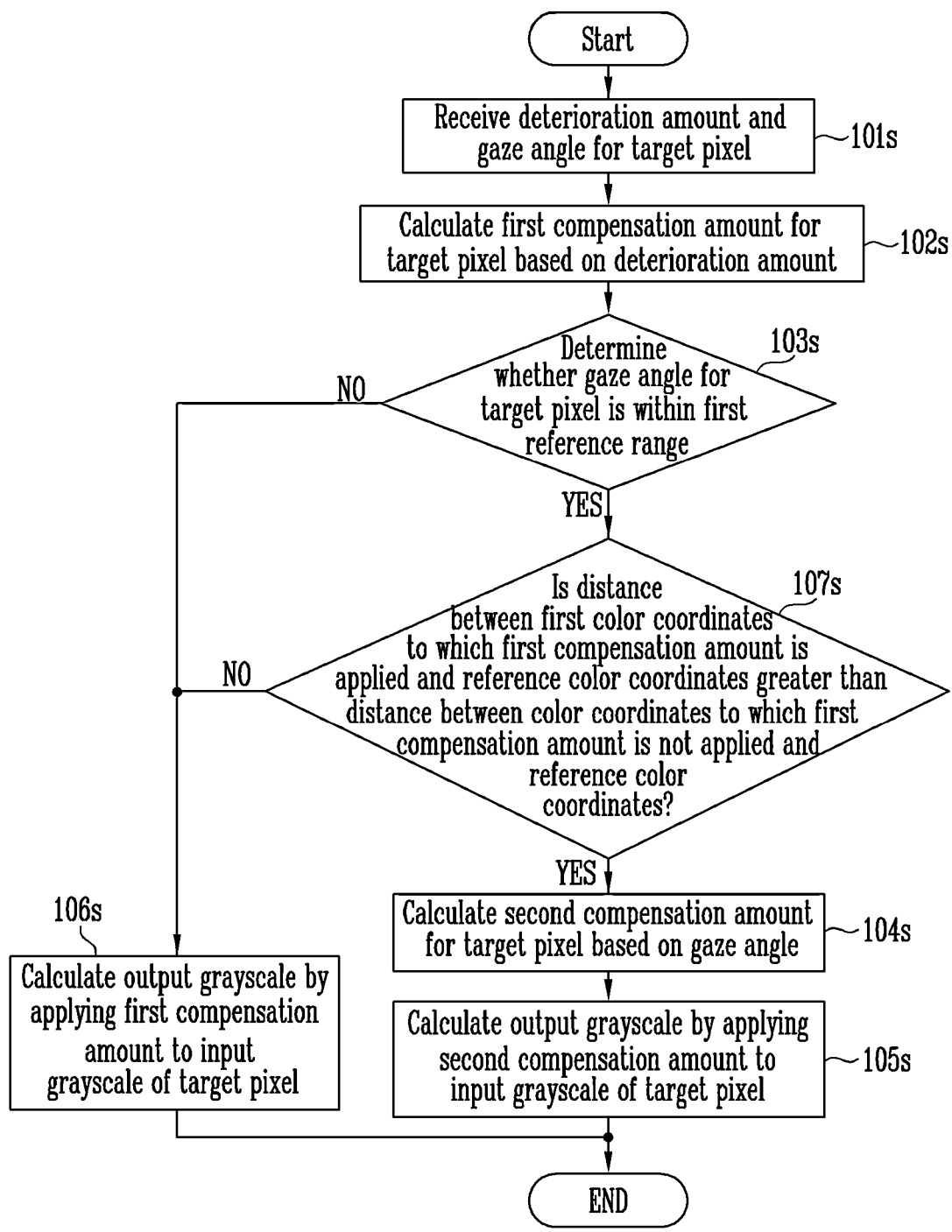
FIGS. 11 and 12 are drawings for illustrating another embodiment of a driving method according to the invention.
Figure 12:
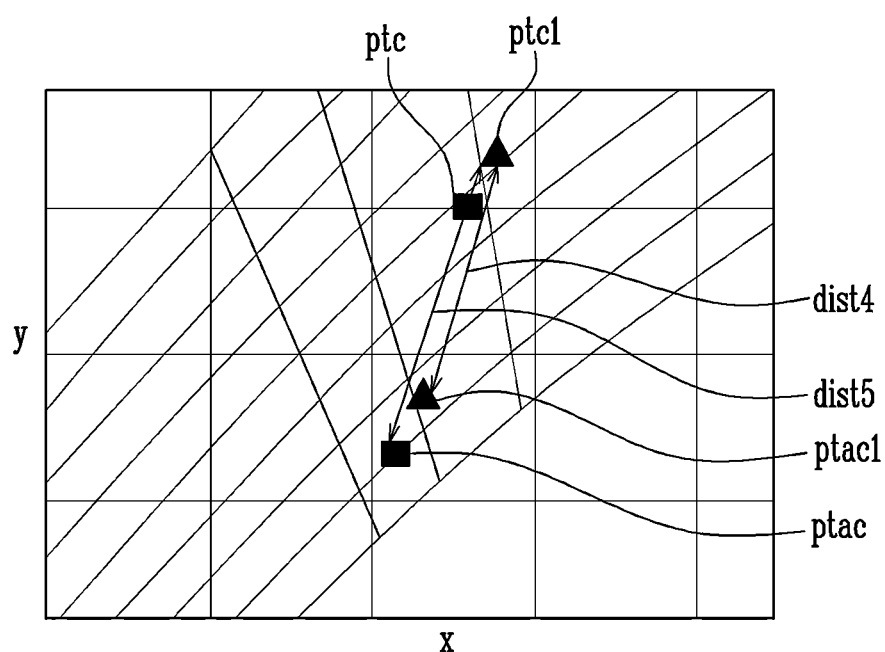

FIGS. 11 and 12 are drawings for illustrating another embodiment of a driving method according to the invention. In the description of the driving method of FIGS. 11 and 12, descriptions of operations overlapping the driving method of FIG. 9 will be omitted.

Referring to FIGS. 11 and 12, when the gaze angle for the target pixel pt is within the first reference range, the deterioration compensator 17 may determine whether a distance dist4 between the first color coordinates ptac1 to which the first compensation amount is applied and the reference color coordinates ptc1 is greater than a distance dist5 between the color coordinates ptac to which the first compensation amount is not applied and the reference color coordinates ptc1 (operation 107s). The reference color coordinates ptc1 may be set to be the same as the color coordinates ptc1 described with reference to FIGS. 7 and 10. In another embodiment, the reference color coordinates may be set to be the same as the color coordinates ptc described with reference to FIGS. 7 and 10.

When the gaze angle is within the first reference range, and the distance dist4 between the first color coordinates ptac1 to which the first compensation amount is applied and the reference color coordinates ptc1 is smaller than the distance dist5 between the color coordinates ptac to which the first compensation amount is not applied and the reference color coordinates ptc1, the deterioration compensator 17 may select the first compensation amount (operations 107s and 106s). That is, in this case (refer to FIG. 12), since deterioration compensation is sufficiently performed with only the first color coordinates ptac1 to which the first compensation amount is applied, the second compensation amount may not be calculated and applied.

When the gaze angle is within the first reference range, and the distance dist4 between the first color coordinates ptac1 and the reference color coordinates ptc1 is greater than the distance dist5 between the color coordinates ptac to which the first compensation amount is not applied and the reference color coordinates ptc1, the deterioration compensator 17 may select the second compensation amount (operations 107s and 104s). That is, in this case, deterioration compensation is not performed sufficiently with only the first compensation amount, and thus it is necessary to calculate and apply the second compensation amount.

Figure 13:
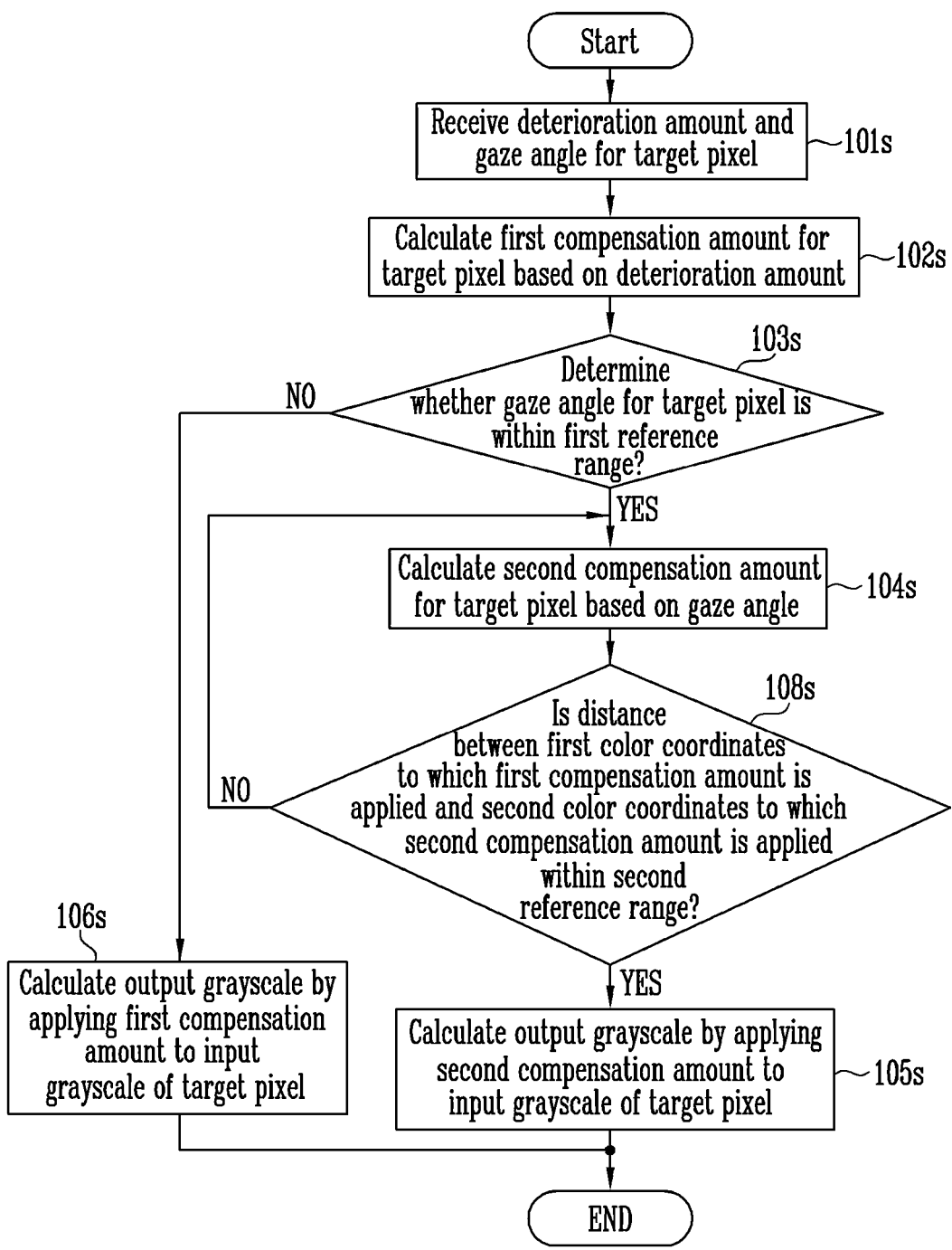
FIGS. 13 to 15 are drawings for illustrating another embodiment of a driving method according to the invention.
Figure 14:
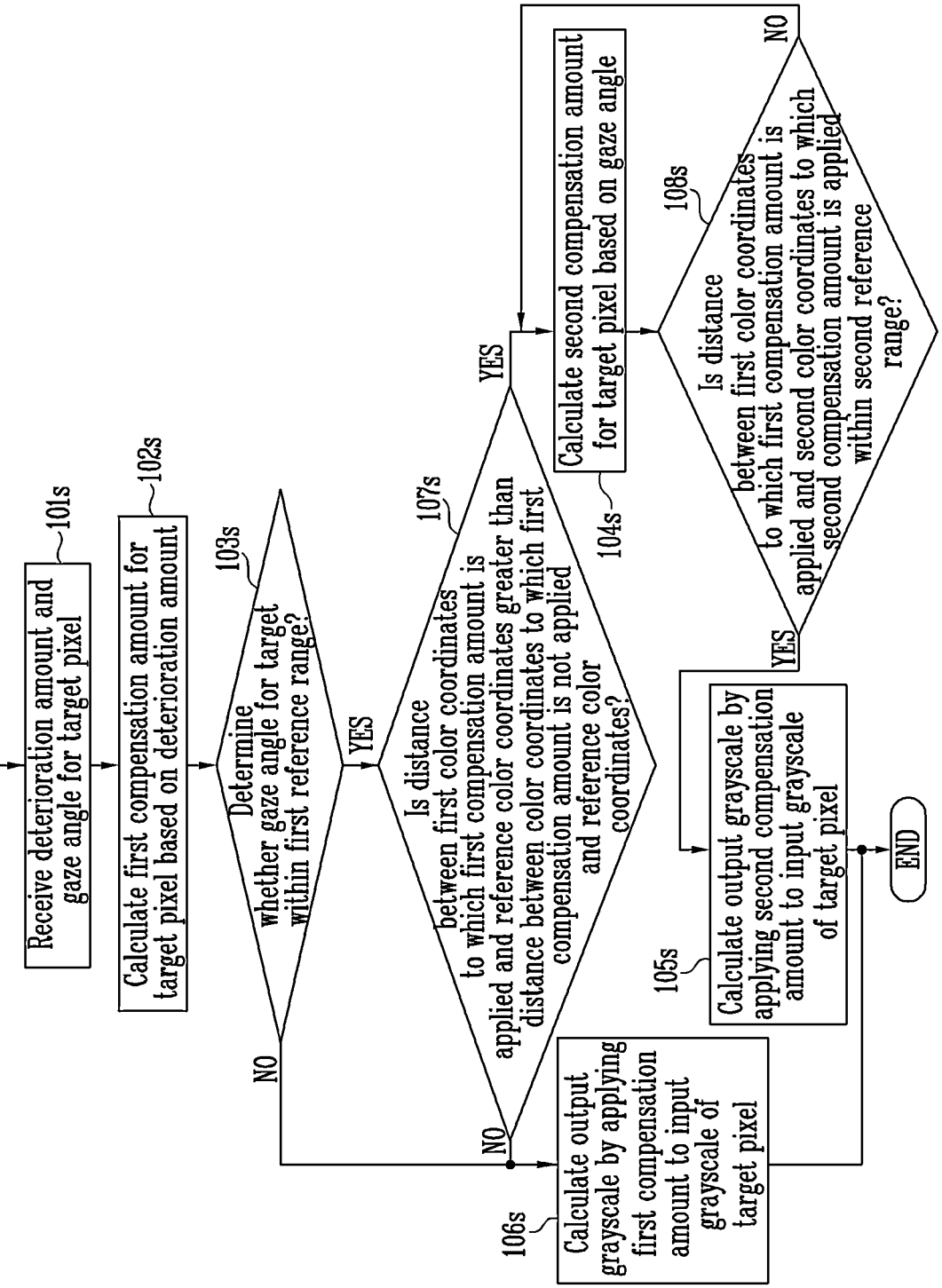
Figure 15:
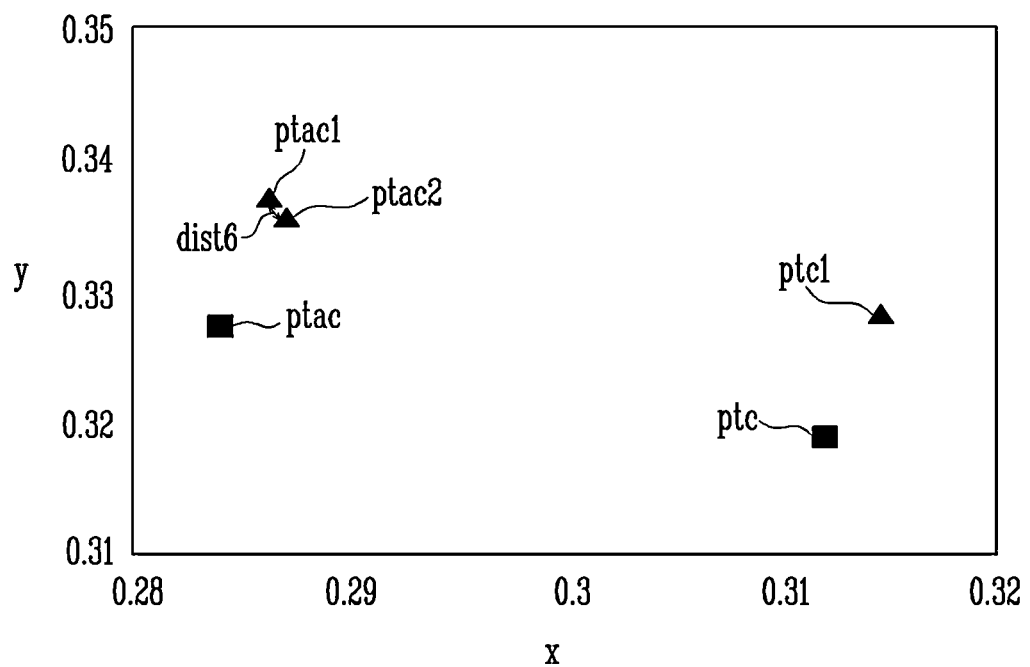

FIGS. 13 to 15 are drawings for illustrating another embodiment of a driving method according to the invention. In the description of the driving method of FIGS. 13 to 15, descriptions of operations overlapping the driving methods of FIGS. 9 and 11 will be omitted.

The driving method of FIG. 13 further includes an operation 108s based on the driving method of FIG. 9. The driving method of FIG. 14 further includes an operation 108s based on the driving method of FIG. 11.

Referring to FIGS. 13 to 15, when calculating the second compensation amount (operation 104s), the deterioration compensator 17 may determine whether a distance dist6 between the first color coordinates ptac1 to which the first compensation amount is applied and the second color coordinates ptac2 to which the second compensation amount is applied is within the second reference range (operation 108s).

When the distance dist6 between the first color coordinates ptac1 to which the first compensation amount is applied and the second color coordinates ptac2 to which the second compensation amount is applied is out of the second reference range, the second compensation amount calculator 173 may recalculate the second compensation amount. In an embodiment, the distance dist6 may be delta xy in the x and y coordinate system or delta uv in the u and v coordinate system, for example. When the distance dist6 is out of the second reference range, the color to which the deterioration compensation is performed may be perceived by the user 2 rather unnaturally. The second reference range may be set differently according to the specification of the display device 1 (refer to FIGS. 1, 4 and 5).

The second compensation amount calculator 173 may recalculate the second compensation amount so that the distance dist6 is narrowed. That is, the distance dist6 between the first color coordinates ptac1 and the second color coordinates ptac2 to which the recalculated second compensation amount is applied may be smaller than the previous distance dist6. By repeating this process, when the distance between the first color coordinates ptac1 and the second color coordinates ptac2 is within the second reference range, the deterioration compensator 17 may select the finally calculated second compensation amount.

Since the drawings and the description of the invention is intended to be illustrative, they were not used to limit the meaning or the scope of the invention described in claims, but merely used to explain the invention. Therefore, it will be understood by those skilled in the art that various modifications and equivalent other embodiments are possible therefrom. Hence, the real protective scope of the invention shall be determined by the technical scope of the accompanying claims.

What is claimed is:

1. A driving method of a display device comprising:
receiving a deterioration amount for a target pixel;
receiving a gaze angle of a user with respect to the target pixel;
selecting one of a first compensation amount corresponding to the deterioration amount for the target pixel and a second compensation amount corresponding to both the deterioration amount and the gaze angle; and
calculating an output grayscale for the target pixel by adding the one of the first compensation amount and the second compensation amount to an input grayscale of the target pixel, wherein
the first compensation amount is selected regardless of the gaze angle.

2. The driving method of a display device of claim 1, wherein
in the selecting,
when the gaze angle is out of a first reference range, the first compensation amount is selected,
the gaze angle is an angle between a display surface of the target pixel and a gaze of the user, and
a case when the gaze angle is out of the first reference range includes a case when the gaze angle is about 90 degrees.

3. The driving method of a display device of claim 2, wherein
in the selecting,
when the gaze angle is within the first reference range, the second compensation amount is selected.

4. The driving method of a display device of claim 3, wherein
in the selecting,
when a distance between first color coordinates to which the first compensation amount is applied and second color coordinates to which the second compensation amount is applied is out of a second reference range, the second compensation amount is recalculated.

5. The driving method of a display device of claim 4, wherein
in the selecting,
a distance between the first color coordinates and recalculated second color coordinates to which a recalculated second compensation amount is applied is smaller than the distance between first color coordinates to which the first compensation amount is applied and the second color coordinates to which the second compensation amount is applied.

6. The driving method of a display device of claim 5, wherein
in the selecting,
when the distance between the first color coordinates and the recalculated second color coordinates is within the second reference range, the second compensation amount finally calculated is selected.

7. The driving method of a display device of claim 2, wherein
in the selecting,
when the gaze angle is within the first reference range and a distance between first color coordinates to which the first compensation amount is applied and reference color coordinates is smaller than a distance between color coordinates to which the first compensation amount is not applied and the reference color coordinates, the first compensation amount is selected.

8. The driving method of a display device of claim 7, wherein
in the selecting,
when the gaze angle is within the first reference range and the distance between the first color coordinates and the reference color coordinates is greater than the distance between the color coordinates to which the first compensation amount is not applied and the reference color coordinates, the second compensation amount is selected.

9. The driving method of a display device of claim 8, wherein
in the selecting,
when a distance between the first color coordinates and second color coordinates to which the second compensation amount is applied is out of a second reference range, the second compensation amount is recalculated.

10. The driving method of a display device of claim 9, wherein
in the selecting,
a distance between the first color coordinates and recalculated second color coordinates to which a recalculated second compensation amount is applied is smaller than the distance between the first color coordinates and second color coordinates to which the second compensation amount is applied.

11. The driving method of a display device of claim 10, wherein
in the selecting,
when the distance between the first color coordinates and the recalculated second color coordinates is within the second reference range, the second compensation amount finally calculated is selected.

12. A display device comprising:
a plurality of pixels which display an image based on output grayscales;
a gaze angle sensor which senses a gaze angle of a user with respect to a target pixel among the plurality of pixels; and
a deterioration compensator which selects one of a first compensation amount corresponding to a deterioration amount for the target pixel and a second compensation amount corresponding to both the gaze angle or being calculated based on the deterioration amount and the gaze angle, and calculates an output grayscale for the target pixel by adding the one of the first compensation amount and the second compensation amount to an input grayscale of the target pixel, wherein
the deterioration compensator selects the first compensation amount regardless of the gaze angle.

13. The display device of claim 12, wherein
the deterioration compensator selects the first compensation amount when the gaze angle is out of a first reference range,
the gaze angle is an angle between a display surface of the target pixel and a gaze of the user, and
a case when the gaze angle is out of the first reference range includes a case when the gaze angle is about 90 degrees.

14. The display device of claim 13, wherein
the deterioration compensator selects the second compensation amount when the gaze angle is within the first reference range.

15. The display device of claim 14, wherein
the deterioration compensator recalculates the second compensation amount when a distance between first color coordinates to which the first compensation amount is applied and second color coordinates to which the second compensation amount is applied is out of a second reference range.

16. The display device of claim 15, wherein
a distance between the first color coordinates and recalculated second color coordinates to which a recalculated second compensation amount is applied is smaller than the distance between first color coordinates to which the first compensation amount is applied and the second color coordinates to which the second compensation amount is applied.

17. The display device of claim 16, wherein
the deterioration compensator selects the second compensation amount finally calculated when the distance between the first color coordinates and the second color coordinates is within the second reference range.

18. The display device of claim 13, wherein
the deterioration compensator selects the first compensation amount when the gaze angle is within the first reference range, and a distance between first color coordinates to which the first compensation amount is applied and reference color coordinates is smaller than a distance between color coordinates to which the first compensation amount is not applied and the reference color coordinates.

19. The display device of claim 18, wherein
the deterioration compensator selects the second compensation amount when the gaze angle is within the first reference range, and the distance between the first color coordinates and the reference color coordinates is greater than the distance between the color coordinates to which the first compensation amount is not applied and the reference color coordinates.

20. The display device of claim 19, wherein
the deterioration compensator recalculates the second compensation amount when a distance between the first color coordinates and second color coordinates to which the second compensation amount is applied is out of a second reference range, and a distance between the first color coordinates and recalculated second color coordinates to which a recalculated second compensation amount is applied is smaller than the distance between the first color coordinates and second color coordinates to which the second compensation amount is applied.

* * * * *